(No Model.)
C. A. MALOTT.
PLOW FENDER.
No. 333,141. Patented Dec. 29, 1885.
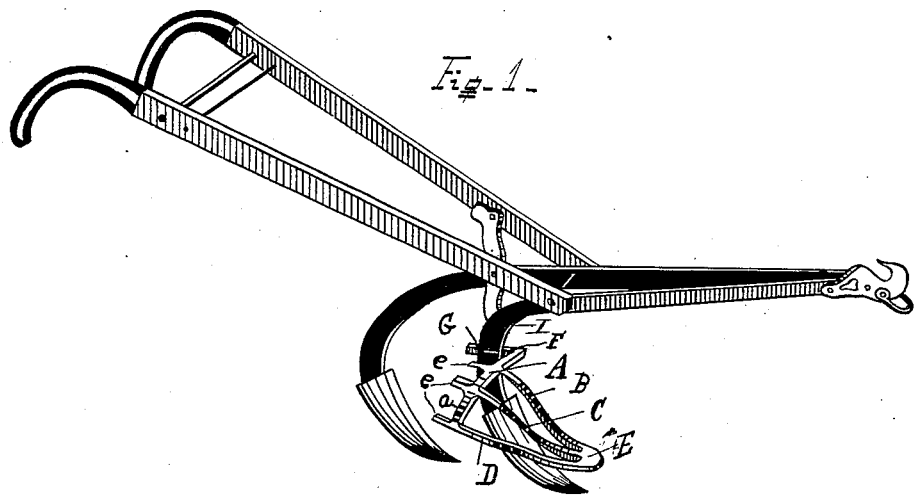
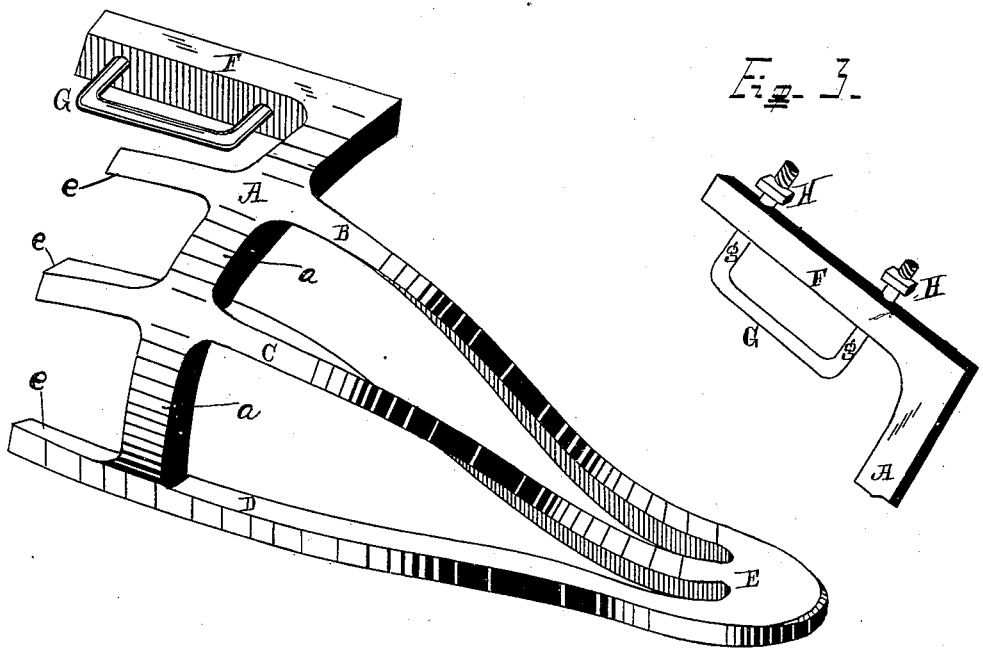
Attest:
Jno. W. [illegible]
O. M. Hill
Inventor.
Charles A. Malott
per
Wm. Hubbell Fisher, Atty.

UNITED STATES PATENT OFFICE.

CHARLES A. MALOTT, OF PERIN'S MILLS, OHIO.

PLOW-FENDER.

SPECIFICATION forming part of Letters Patent No. 333,141, dated December 29, 1885.

Application filed August 15, 1884. Serial No. 140,612. (No model.)

*To all whom it may concern:*

Be it known that I, CHARLES A. MALOTT, a resident of Perin's Mills, Clermont county, Ohio, have invented certain new and useful Improvements in Plow-Fenders, of which the following is a specification.

In plowing tobacco considerable trouble is experienced from the plow throwing the soil over the leaves. As these leaves grow close to the ground and spread out, it is impossible to avoid covering them with soil when the ordinary plow is used. This fact necessitates one or more persons following the plow, to uncover the leaves. While this is particularly true of tobacco, it is also true of other plants, notably potatoes, and great inconvenience arises from it. To avoid this difficulty, I have invented my fender, which can be attached to any double-shovel plow or plow for plowing tobacco, and which gently lifts the leaves off the ground and turns them aside as the plow passes, thereby preventing them being covered with dirt, and allowing the plow to throw the fresh finely-broken ground about the base of the plant.

While my invention is applicable to various descriptions of double-shovel plows, I will, for the purpose of illustration, describe it and its mode of operation in connection with what is known as the "Malta plow."

The several features of my invention and the various advantages arising from their use, conjointly or otherwise, will be apparent from the following description and claims.

In the accompanying drawings, Figure 1 shows in perspective a double-shovel Malta plow provided with my device. Fig. 2 is a perspective view of the fender itself detached. Fig. 3 shows the preferred apparatus for attaching it to the plow.

A curved piece, A, has welded to it or cast with it several (preferably three) ribs, B C D, which unite with each other in the toe E. The toe E is flat, and assumes a horizontal position when the fender is in place. The rib D will also be horizontal; but the ribs B and C are twisted so that their upper surfaces may coincide with the surface of the piece A. In this way they give to the fender a somewhat helical outline, which enables it the more readily to raise and uphold the leaves while the plow is passing the plant.

The preferred means for connecting the fender to the plow or frame is as follows: Proceeding at right angles from the piece A is an arm, F, through which the staple G passes, its two arms $g$ $g$ sliding loosely in corresponding holes in the arm F. The ends of the arms $g$ are provided with a thread, on which the set-nuts H respectively screw.

The fender is preferably made of malleable iron, but may be made of cast-iron or steel.

In applying the fender to the plow, the staple G is passed over the sheth of the plow I, as shown in Fig. 1, and the fender secured in place by tightening the set-nuts H. The fender is so set that when the shovel of the plow is in the ground the toe E of the fender will be at or slightly above the surface of the ground. In this position, as the plow is drawn along, the toe E passes under the leaves, as the plow reaches them, and gently turns them back toward the plant, keeping them clear of the dirt thrown by the shovel. The spaces between the ribs of the fender allow the soil to be thrown through them, reaching the roots of the plants. The portions $a$ $a$ of the bar A are preferably placed at some distance forward of the rear ends of the bars B, C, and D. Pieces $e$, preferably extensions of the bars B C D, are preferably connected to the rear of the portions $a$ $a$ of bar A. Such a construction imparts great strength to the fender, the latter being at the same time very competent in the functions which it is to perform.

While the various features of my invention are preferably employed together, one or more of them may be employed without the remainder, and, so far as applicable, one or more of said features may be employed with plows of a construction different from that particularly herein set forth.

I am aware that Isaac Davis has invented a fender made of straight bars connected to a cross-bar and uniting and extending in an elongated nose, for which he filed an application for Letters Patent on January 20, 1885, Serial No. 153,438, and I lay no claim whatever to the invention of his device. My invention is different from Davis'; and it consists in so uniting and arranging these bars in a helical or double-curved shape as to produce a new and useful result. Instead of the bars being united in one and extended in an elongated nose, the bars in my fender all meet in a nose, (not elongated,) and at this point the bars gradually begin the helical curve, which enables the fender to accommodate itself to any-sized leaf.

What I claim as new and of my invention is—

1. A fender of helical shape, for lifting and turning aside leaves, plants, &c., in front of the plow, the spaces between the bars being open to allow the soil to pass through, substantially as and for the purposes specified.

2. The fender consisting of piece A, horizontal rib D, twisted or helical ribs or bars B C, and nose, the spaces between the ribs admitting the loose earth to be thrown up around the base of the plant, substantially as and for the purposes specified.

3. The fender consisting of piece A, helical pieces B C, and piece D, converging and uniting at the forward end in a nose, the piece D having a bottom inclined upward from nose to rear, and extensions e, at rear of piece A, curved downward and inward, and arm F, substantially as and for the purposes specified.

4. The fender composed of ribs and piece A, the upper ribs being helically shaped, and the general shape of the fender being outwardly convex at or near its center, substantially as and for the purposes specified.

CHARLES A. MALOTT.

Witnesses:
JNO. W. STREHLI,
O. M. HILL.